United States Patent [19]
Williams, Jr.

[11] 3,754,126
[45] Aug. 21, 1973

[54] INTEGRATING CONVEYOR SCALE

[75] Inventor: Roger B. Williams, Jr., Sylvania, Ohio

[73] Assignee: Reliance Electric Company, Toledo, Ohio

[22] Filed: Jan. 6, 1972

[21] Appl. No.: 215,870

[52] U.S. Cl.......... 235/151.33, 177/16, 235/150.51, 235/183
[51] Int. Cl. .......................... G01g 11/14, G06g 7/18
[58] Field of Search............... 235/194, 183, 151.33, 235/150.52, 150.51, 150.3; 177/3, 4, 15, 16, 25; 198/39, DIG. 11; 214/2

[56] References Cited
UNITED STATES PATENTS

| | | | |
|---|---|---|---|
| 3,610,908 | 10/1971 | Karosas............................ | 177/16 X |
| 3,358,129 | 12/1967 | Schultz ............................... | 235/194 |
| 3,333,649 | 8/1967 | Schafsteller....................... | 177/16 X |
| 3,466,460 | 9/1969 | Connolly.......................... | 235/194 X |
| 3,500,200 | 3/1970 | Woodhead....................... | 235/194 X |
| 3,662,845 | 5/1972 | Pratt..................................... | 177/25 |

Primary Examiner—Joseph F. Ruggiero
Attorney—Thomas H. Grafton

[57] ABSTRACT

An improved method and apparatus for measuring the rate at which material is transferred through a region and for measuring the total quantity of material transferred through the region over a period of time. A pulse train is generated having constant width pulses which are repeated at a rate proportional to the speed at which the material is transferred through the region. The pulse train is amplitude modulated with an analog signal which is proportional to the instantaneous weight of material in the region. The modulated pulse train is then filtered or averaged to obtain a continuous analog signal which is proportional to the transfer rate for driving a rate indicating meter. The rate signal is also converted to a frequency modulated pulse signal for stepping a counter which indicates the total quantity of material transferred over a period of time. Circuitry is provided for automatically zeroing the analog weight signal and for inhibiting measurements of less than a predetermined percentage of the maximum capacity of the apparatus.

17 Claims, 8 Drawing Figures

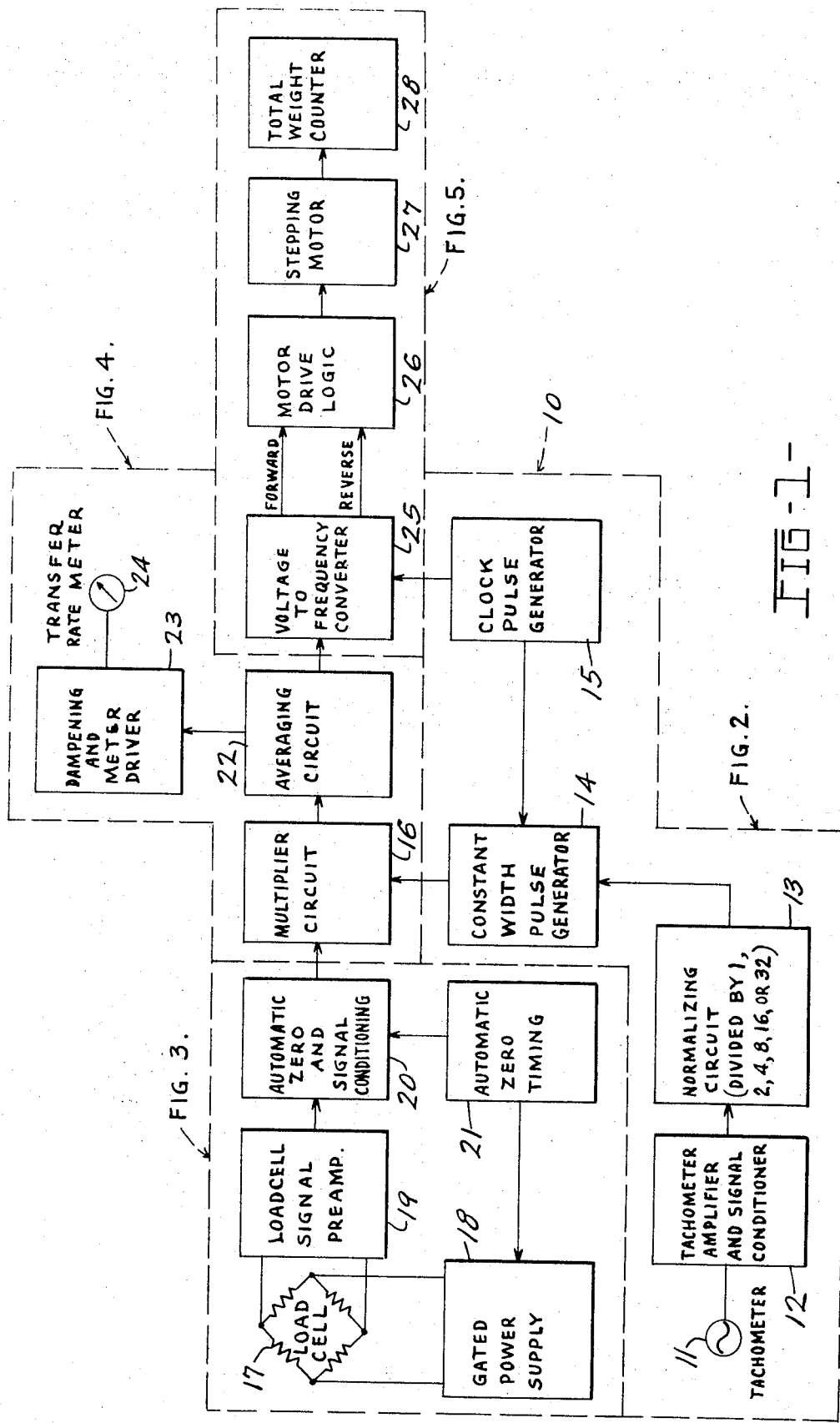

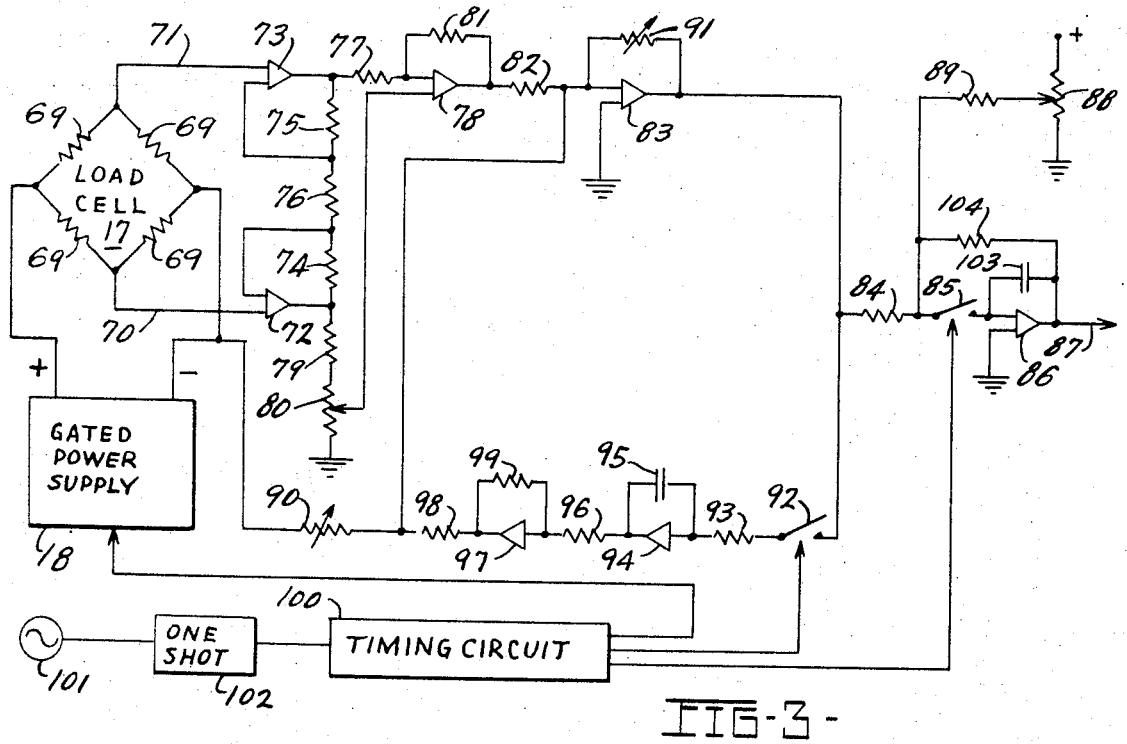
FIG-3-
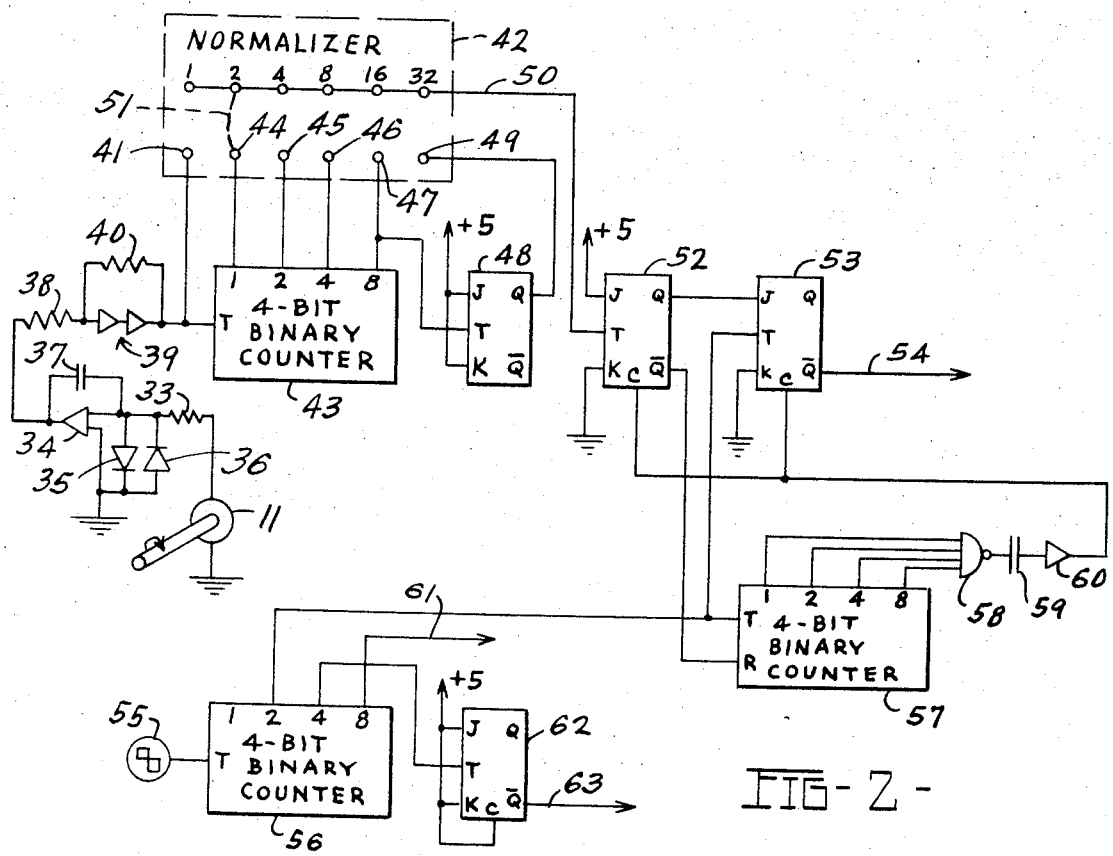
FIG-2-

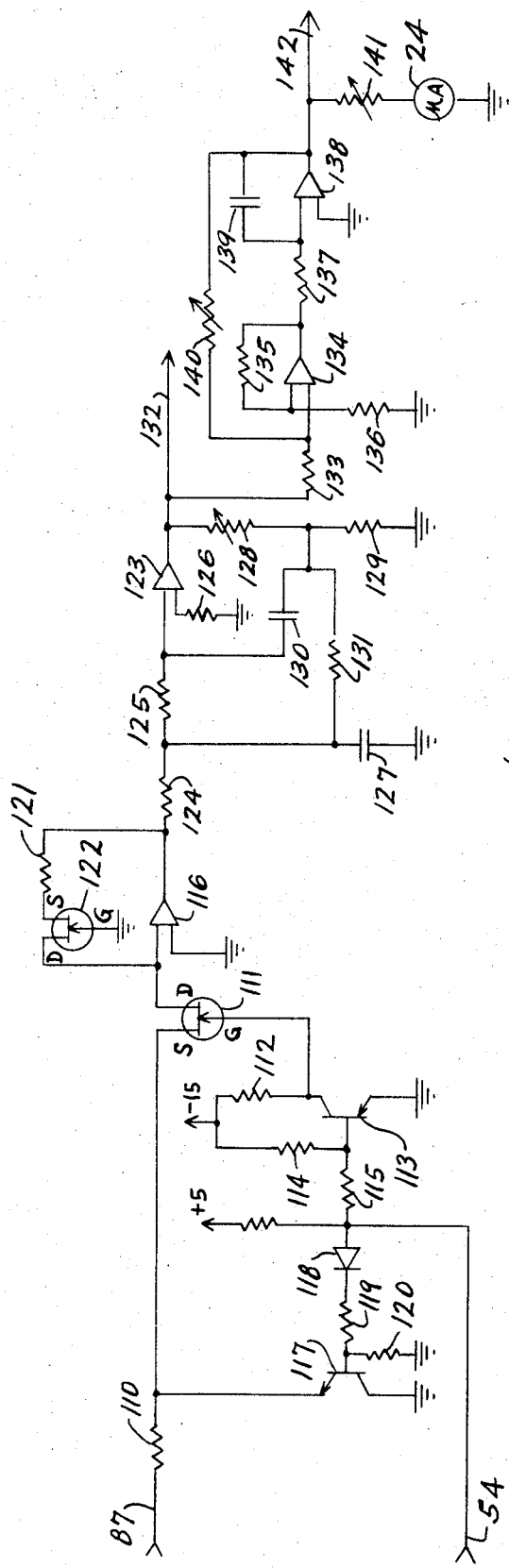
FIG-4-

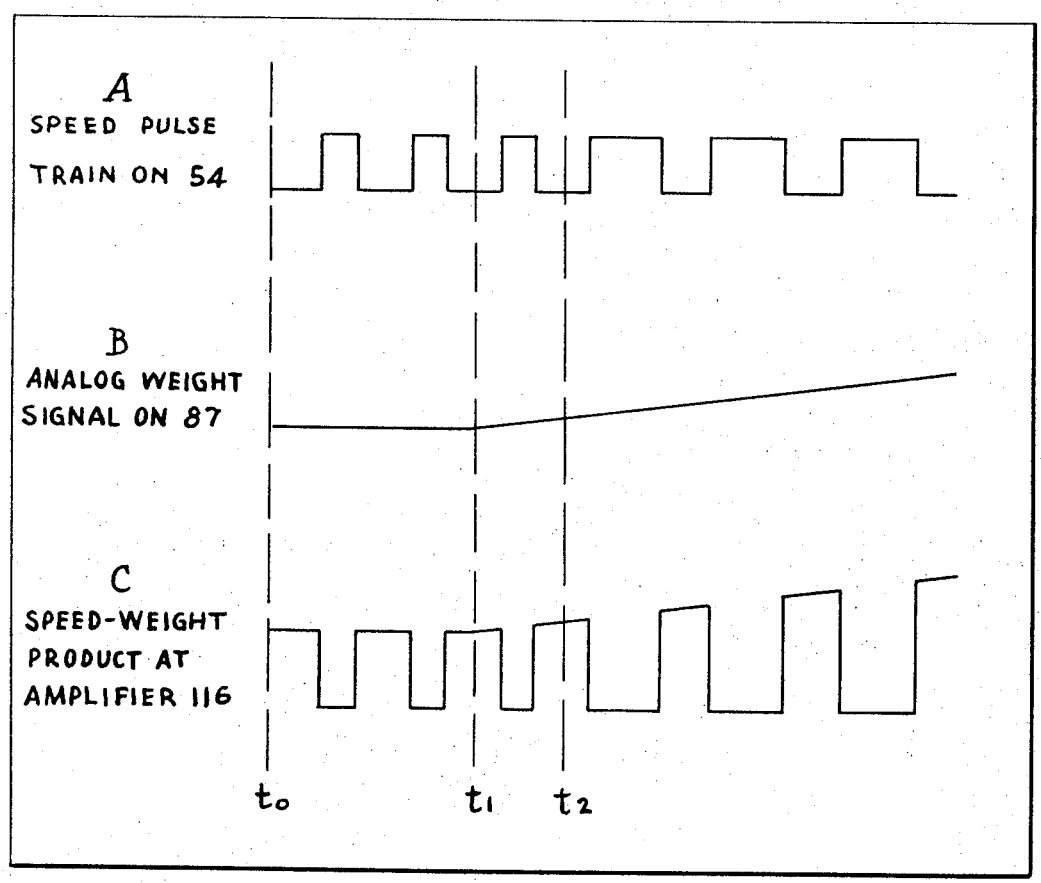
FIG-4a-

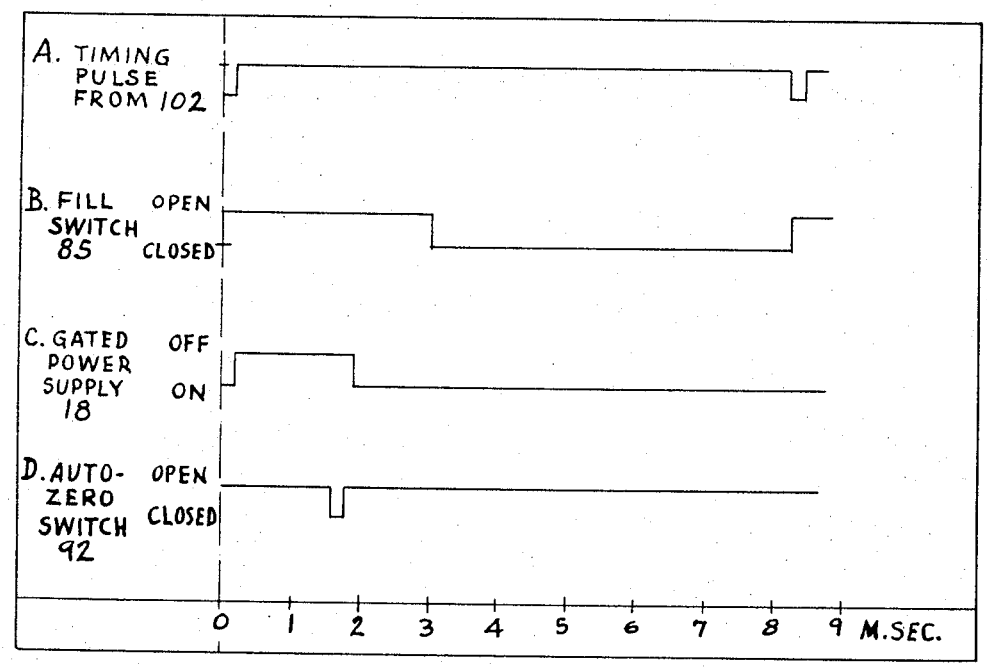
FIG-6-
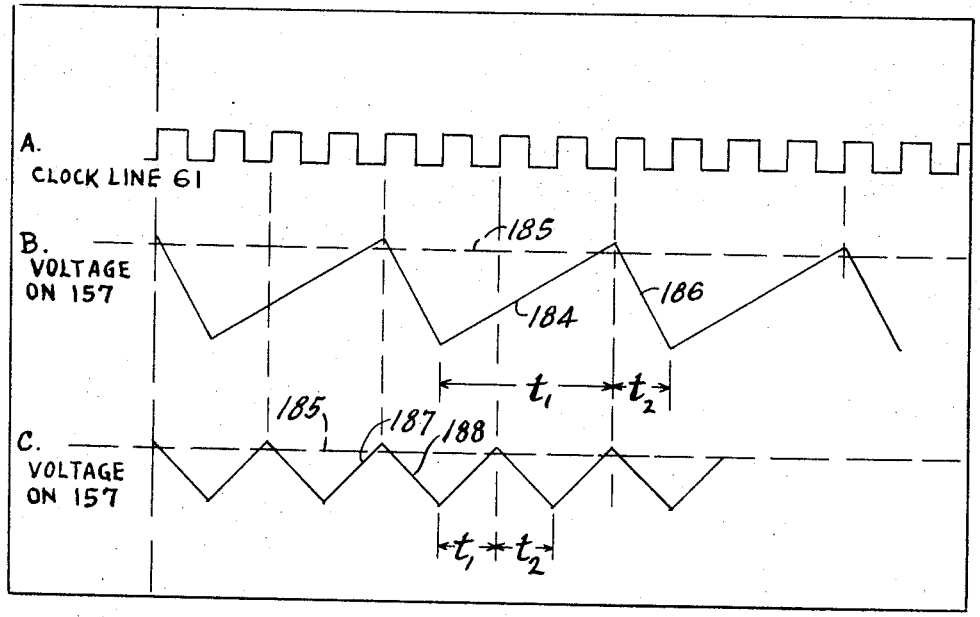
FIG-7-

INTEGRATING CONVEYOR SCALE

BACKGROUND OF THE INVENTION

This invention relates generally to measuring apparatus, and more particularly to an improved integrating conveyor scale and method for totalizing the quantity of material transported through a region on conveying apparatus such as a belt conveyor and for simultaneously measuring the instantaneous rate at which the material is transferred through the region.

In bulk material handling, it is often desirable to measure the total quantity of material delivered or transferred over a period of time and to measure the rate at which material is being transferred at any given instance. Bulk materials are often transferred, for example, from a supply hopper into a batch hopper by means of either a belt conveyor or of a screw conveyor. When batch ingredients are compounded within a batch hopper according to a formula, a measure of the total weight of each ingredient delivered into the batch hopper is quite important to maintain the compounded batch within predetermined tolerance limits for the formula. Such measurements may be made by conveyor scales.

It is readily apparent that the product of the speed at which material is delivered through a region times the weight of material within the region will equal the delivery rate. For example, if five pounds of material are on a one lineal foot segment of a belt conveyor moving at ten feet per minute, the instantaneous transfer rate for this segment of the conveyor is 50 pounds per minute. If this transfer rate is shown as a curve on a graph with respect to time, it will be appreciated that the area under the curve over a time interval, or the integral of the curve for the time interval, will equal the total weight of material delivered during such time interval.

In the past, both mechanical and electrical integrating conveyor scales have been constructed for measuring the total quantity of a material transferred or conveyed over a period of time. These scales have met with varying degrees of success. In many instances, the scales have had a very limited accuracy. Prior art integrating scales have also at times been inefficient. Difficulty in changing the range of a scale to meet requirements of each installation has resulted in the use of less than an optimum range in many installations. When, for example, a tachometer has been used to measure the speed of a conveyor, it has been necessary to change drive gears for the tachometer to bring the scale output within a suitable range. Problems have also occurred during installation of prior art integrating conveyor scales due to the bulkiness and mechanical limitations of such scales and the need to meet limited available space at some installations.

SUMMARY OF THE INVENTION

According to the present invention, an improved integrating conveyor scale and an improved measuring method are provided for accurately measuring the rate at which a material is transferred and for simultaneously measuring the total weight of material transferred over a period of time. The scale includes a tachometer or similar apparatus for generating an alternating current having a frequency proportional to the speed at which the material is transferred. The output of the tachometer is amplified, conditioned and converted into a pulse train having constant width pulses which are spaced or repeated at a rate proportional to the speed at which the material is transferred. Circuitry is provided for electronically normalizing or selectively dividing the pulse train by any of several predetermined values to establish a range for the scale suitable for different conveyor speeds in different installations without the need of changing drive gears for the tachometer.

The scale also includes one or more load cells for generating an analog signal proportional to the weight of material in a region through which the material is conveyed. The analog weight signal is periodically interrupted and the weighing apparatus is automatically zeroed to compensate for zero drift and transient signals. A constant output signal is maintained while the load cell output is interrupted for the zeroing operation.

A multiplier or modulator circuit modulates the amplitude of the constant width pulses from the conveyor speed measuring circuitry in response to the analog weight signal. The resulting signal is then averaged to obtain a continuous analog signal proportional to the instantaneous rate at which the material is transferred. This signal may be amplified to drive an instantaneous transfer rate indicating meter and to drive auxiliary equipment such as conveyor speed control equipment. The transfer rate signal is also converted in a voltage-to-frequency converter to obtain a pulse signal for stepping a counter. The counter measures and indicates the total weight of material transferred over a period of time. The voltage-to-frequency converter and the counter thus integrate the analog transfer rate signal.

Accordingly, it is a preferred object of the invention to provide improved apparatus for measuring the rate at which material is transferred and the total weight of material transferred over a period of time.

Another object of the invention is to provide an improved integrating conveyor scale.

A further object of the invention is to provide an improved integrating conveyor scale including circuitry for automatically zeroing the scale output for transient signals and zero drift occuring in the weight measuring portion of the circuitry.

Another object of the invention is to provide an improved method and circuitry for changing the range of an integrating conveyor scale to meet specific installation requirements for such scale.

Still another object of the invention is to provide an improved method and improved circuitry in a conveyor scale for multiplying conveyor speed times the instantaneous weight of material being conveyed through a region to measure the instantaneous transfer rate.

Other objects and advantages of the invention will become apparent from the following detailed description, with reference being made to the accompanying drawings.

BRIEF DESCRIPTION OF THE DRAWINGS

FIG. 1 is a block diagram of an improved integrating conveyor scale constructed in accordance with the present invention;

FIG. 2 is a detailed schematic logic diagram of a circuit for generating a frequency modulated pulse train having constant width pulses which are repeated at a rate proportional to the conveyor speed in an integrating conveyor scale according to the present invention;

FIG. 3 is a detailed schematic logic diagram of circuitry for generating an analog signal proportional to the weight of material on a conveyor segment and of the automatic zero circuitry in an integrating conveyor scale according to the present invention;

FIG. 4 is a detailed schematic logic diagram of the multiplier or modulator circuitry, the averaging circuit and the rate indicating circuitry in an integrating scale constructed in accordance with the present invention;

FIG. 4a is a graph showing the operation of the multiplier circuitry of FIG. 4;

FIG. 6 is a graph showing the timing of the automatic zero circuitry of FIG. 3; and FIG. 7 is a graph showing operation of the voltage-to-frequency converter of FIG. 5.

DESCRIPTION OF THE PREFERRED EMBODIMENT

Figure 5:
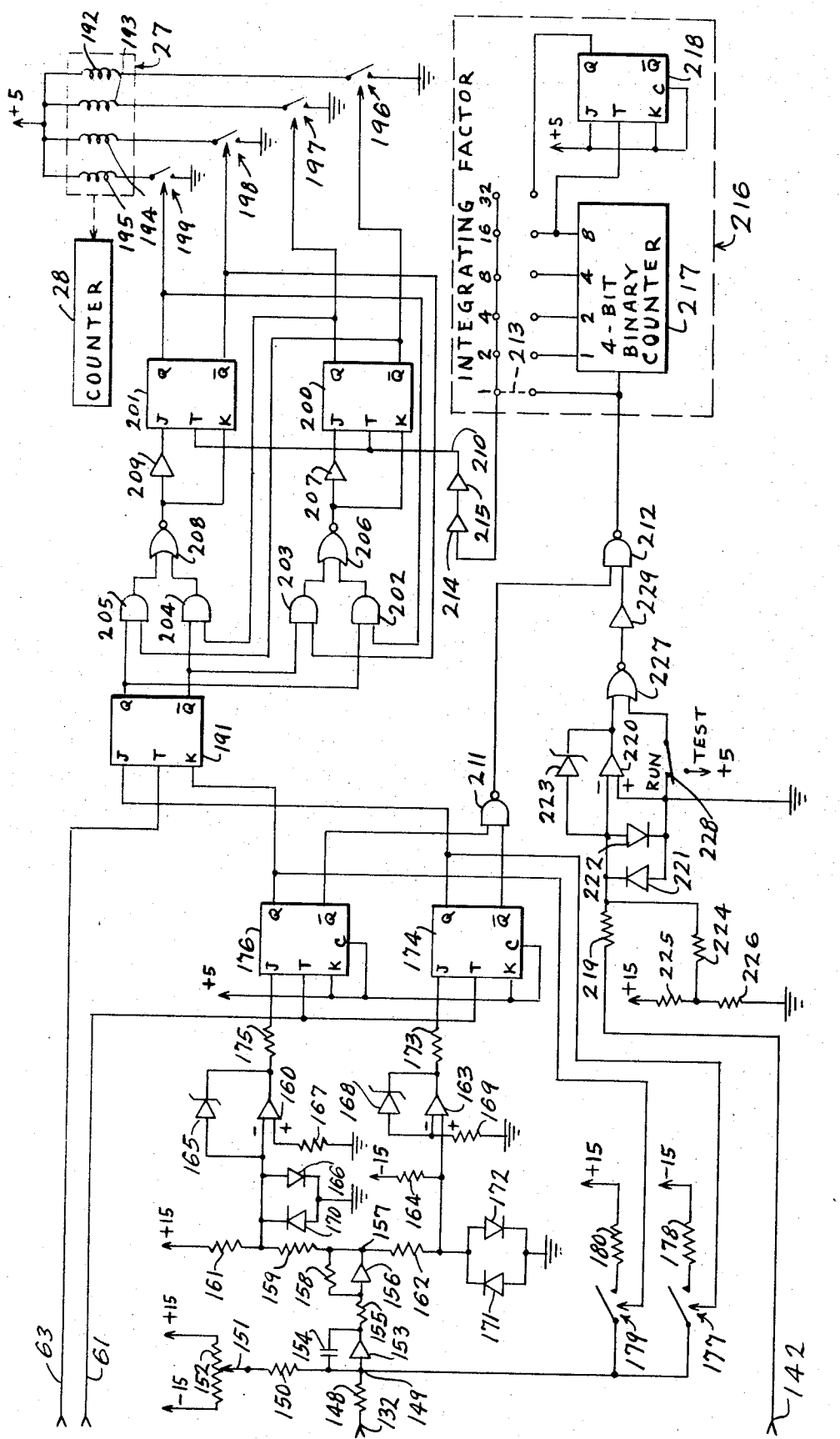
FIG. 5 is a detailed schematic logic diagram of a voltage-to-frequency converter and of a counter circuit for indicating the total weight of material conveyed over a period of time for an integrating conveyor scale according to the present invention.

Referring now to FIG. 1, a block diagram is shown of an improved integrating conveyor scale 10 constructed in accordance with the present invention. The scale 10 is particularly suitable for measuring the rate at which material is transferred on, for example, a belt conveyor and for measuring the total weight of material transferred over a period of time. It will, of course, be appreciated that the scale 10 is adaptable for use with other types of conveyors such as screw conveyors and pipes or conduits conveying either a fluid or a particulate material. In the following description, the scale 10 is described in combination with a belt-type conveyor. However, the scale 10 is clearly not limited to use with only belt conveyors.

A conventional tachometer 11 is driven by the belt conveyor for generating either a pulse signal or an alternating current having a frequency proportional to the speed of the conveyor. A circuit 12 amplifies the output of the tachometer 11 and from such amplified output generates a pulse train having the same frequency as the output of the tachometer 11. The pulse train from the amplifier and conditioner circuitry 12 passes through a normalizing circuit 13. The normalizing circuit 13 selectively divides the pulse train by a factor of one, two, four, eight, 16 or 32 for electronically changing the range of the output of the scale 10. The normalizing circuit 13 facilitates use of the scale 10 with different belt conveyors having maximum speeds, for example, of from 20 to 1,000 feet per minute.

The normalized pulse train is applied to a constant width pulse generator 14 which generates a new train of pulses. Each pulse from the normalizing circuit 13 initiates the formation of a new pulse at the output of the generator 14. The width of the output pulse from the generator 14 is fixed and is determined by a predetermined count of timing pulses from a clock pulse generator 15. The output of the constant width pulse generator 14 is applied to one input of a multiplier circuit 16.

The scale 10 generates a second signal from the belt conveyor. This signal is proportional to the weight of material on a segment of the conveyor or, in other words, the weight of material conveyed through a predetermined region. The region may, for example, comprise a portion of the conveyor belt extending between a pair of load carrying idlers which support a segment of the conveyor belt. The idlers are mounted on a frame which rests on one or more load cells 17. The load cell 17, when energized by a gated power supply 18, generates an analog signal which is proportional to the total weight on the load cell 17. The analog signal from the load cell 17 is applied through a preamplifier 19 to zeroing and conditioning circuitry 20. A timing circuit 21 periodically turns off the power supply 18 to interrupt power to the load cell 17. While power is interrupted, the timing circuit 21 causes the conditioning circuit 20 to automatically establish a zero output, thus neutralizing or balancing the output of the preamplifier 19 for transient signals and unbalanced conditions occurring, for example, from component ageing and temperature drift. While the timing circuit 21 interrupts the output of the power supply 18, a signal is maintained at the output of the conditioning circuit 20 which is identical to its output immediately prior to interruption of the output of the power supply 18. The output from the conditioning circuit 20 may also be balanced or zeroed for the tare weight of the conveyor belt and idlers on the load cell 17 such that the conditioning circuit 20 will have a zero output when the conveyor belt is empty. The output of the conditioning circuit 20 is applied to the multiplier circuit 16.

The multiplier circuit 16 modulates the amplitude of the pulse train from the constant width pulse generator 14 with the continuous analog weight signal from the conditioning circuit 20. The modulated pulse train output from the circuit 16 is, in effect, the product of the pulse train output of the generator 14 and the analog signal output from the conditioning circuit 20. The average value of the modulated pulse train output from the multiplier circuit 16 is proportional to the rate at which material is conveyed on the belt conveyor. A circuit 22 averages or filters the modulated pulse train to produce a continuous analog signal which is proportional to the material transfer rate. This signal may be amplified and dampened in a circuit 23 for driving an instantaneous transfer rate meter 24. The amplified and dampened signal may also be used for driving apparatus external to the scale 10, for example, for driving a recorder or for driving control apparatus for the conveyor.

The continuous analog output from the averaging circuit 22 is also applied to a voltage-to-frequency converter 25. Operation of the converter 25 is controlled by timing pulses from the generator 15. The converter 25 generates a frequency modulated pulse train which has a frequency proportional to the transfer rate. This pulse train is applied through motor drive logic 26 for driving a stepping motor 27 forward or backward, depending upon the polarity of the analog output of the averaging circuit 22. The stepping motor 27 drives a counter 28 which is calibrated to indicate the total weight of material conveyed by the belt conveyor over a period of time. The motor 27 is adapted to be driven either forward or in reverse so that the scale 10 may be set to an accurate dynamic zero.

In a preferred form, the voltage-to-frequency converter 25 is adapted to have an inhibited or blocked output when the analog rate signal from the averaging circuit 22 is less than a predetermined small percentage of the maximum transfer rate of the conveyor. The voltage-to-frequency converter 25 may, for example, be adapted to have no output when less than two percent of the maximum material transfer rate is measured by the load cell 17 and the tachometer 11. This prevents the counter 28 from falsely indicating transient signals occurring when the belt conveyor is empty. The counter 28 also would not measure irregularities in the weight of the moving conveyor belt when the conveyor belt is empty.

Turning now to FIG. 2, a detailed schematic logic diagram is shown of the circuit for generating a pulse train having constant width pulses which are repeated at a frequency proportional to the speed of the belt conveyor. The tachometer 11 is driven at a speed and proportional to the speed of the belt conveyor and may be of conventional design, such as a magnetic pulse generator or an alternating current generator. The tachometer 11 may be driven by any suitable means connected to the belt conveyor. The tachometer 11 may have either a pulse output or a sinusoidal output which increases in frequency with increases in speed of the conveyor.

The output from the tachometer 11 is applied through a resistor 33 to the input of an operational amplifier 34. A pair of reverse biased diodes 35 and 36 are connected in parallel between the input of the amplifier 34 and ground to clip or limit the maximum magnitude of the input to the amplifier 34. A capacitor 37 is connected between the output and the input of the amplifier 34, causing the amplifier 34 to integrate its input. The output of the amplifier 34 will be determined by the charge on the capacitor 37. This output has the same frequency as the frequency of the alternating current output from the tachometer 11.

The output of the amplifier 34 is applied through a resistor 38 to a pair of inverters 39 wired as a Schmitt trigger. A resistor 40 is connected between the output and the input of the Schmitt trigger 39 for determining, along with the resistor 38, the hysteresis of the Schmitt trigger 39. The output of the Schmitt trigger 39, which is a direct current pulse train, is connected to a "divide-by-one" terminal 41 on a normalizer jumper panel 42 and to the trigger input of a four-bit binary counter 43. The binary counter 43 has four outputs which are connected, respectively, to a divide-by-two terminal 44, a divide-by-four terminal 45, a divide-by-eight terminal 46 and a divide-by-16 terminal 47, all in the normalizer jumper panel 42. The divide-by-16 output of the counter 43 which is attached to the terminal 47 is also attached to the trigger input of a flip-flop 48. The Q output of the flip-flop 48 is connected to a divide-by-32 terminal 49 in the jumper panel 42. It will be readily apparent that the terminal 41 will have a pulse for every pulse appearing at the output of the Schmitt trigger 39. The signal on the terminal 44 will change logic levels once for every pulse applied by the Schmitt trigger 39 to the trigger input of the counter 43, thereby dividing the frequency of the output of the Schmitt trigger 39 by two. Similarly, the signal on the terminal 45 will change for every two trigger pulses applied to the counter 43, the signal on the terminal 46 will change for every four trigger pulses and the signal on the terminal 47 will change for every eight trigger pulses. The flip-flop 48 is, in effect, a divide-by-two circuit which causes the signal on the terminal 49 to change for every sixteen trigger pulses from the Schmitt trigger 39. A common output terminal 50 from the jumper panel 42 is selectively connected by means of a jumper wire 51 to one of the terminals 41, 44, 45, 46, 47 or 49. The jumper wire 51 is shown in FIG. 2, for example, connected between the common output terminal 50 and the divide-by-two terminal 44. Thus, the output on the terminal 50 will change signs or logic levels once for every cycle or pulse of the output of the tachometer 11.

Each pulse appearing on the output 50 from the normalizer jumper panel 42 triggers a flip-flop 52 to set the Q output high and $\overline{Q}$ output low. The high Q output from the flip-flop 52 is applied to the J input of a flip-flop 53. The next trigger pulse applied to the flip-flop 53 sets the flip-flop 53 to a high Q output and to a low $\overline{Q}$ output 54.

A conventional crystal oscillator controlled clock 55 generates a uniform pulse train for triggering a four-bit binary counter 56. The two output of the counter 56, which is one-quarter the frequency of the clock 55, is connected to supply trigger pulses to set the flip-flop 53 and also to count another four-bit binary counter 57. The counter 57 has a reset terminal which is connected to the $\overline{Q}$ output of the flip-flop 52. Thus, the counter 57 will start counting timing pulses from the counter 56 as soon as the flip-flop 52 is set by a pulse on the common output 50 from the jumper panel 42. The four outputs of the counter 57 are connected to a NAND gate 58. The NAND gate 58, which normally has a high output, will have a low output when the counter 57 is counted up by sixteen trigger pulses from the counter 56. After sixteen counts, the four outputs of the binary counter 57 will all be high. On the count of 16, the momentary low output from the NAND gate 58 passes a pulse through a capacitor 59 and an inverter 60 for generating a pulse to clear the flip-flops 52 and 53. Thus, the flip-flop 53, once set by the flip-flop 52, will remain set for a count of 16 pulses from the binary counter 56 and then the flip-flop 53 will be cleared.

The clock 55 and the binary counter 56 are also used for generating other timing signals for operating the voltage-to-frequency converter 25 and the motor drive logic 26. The eight output of the four-bit binary counter 56 applies timing pulses to a clock line 61. The four output of the counter 56 is connected to the trigger input of a flip-flop 62. The $\overline{Q}$ output of the flip-flop 62 supplies clock pulses to a clock line 63. Similar pulse trains will appear on the clock lines 61 and 63. However, the time required to set and to clear the flip-flop 62 causes a slight phase lag in the pulse train on the clock line 63. Connections to the clock lines 61 and 63 will be discussed below under the description for FIG. 5.

A circuit for generating a continuous analog signal proportional to the weight of material on a segment of the belt conveyor is shown in detail in FIG. 3. The instantaneous weight of the material on the conveyor belt segment is sensed by the load cell 17 which comprises a bridge arrangement of four strain gauges 69. Although only a single load cell 17 is shown, several load cells may be connected in parallel. Power is supplied to the load cell 17 from the gated power supply 18. The power supply 18, as well as all other power supplies for operating the scale 10, are preferably designed to track or follow a single reference voltage to minimize measurement errors caused by voltage fluctuations in various parts of the scale 10. When the gated power supply 18 is on, the load cell 17 has low voltage positive and negative outputs 70 and 71. The voltage appearing across the outputs 70 and 71 of the load cell 17 will be proportional to the total load on the load cell 17.

The outputs 70 and 71 from the load cell 17 are connected, respectively, to inputs of a pair of operational amplifiers 72 and 73. The gain of the amplifier 72 is determined by the ratio of the feedback resistor 74 and resistor 76. The resistor 74 is connected between the output and an input of the amplifier 72. Similarly, the gain of the amplifier 73 is determined by the ratio of the feedback resistor 75 and resistor 76. The resistor 75 is connected between the output and an input of the amplifier 73. These inputs of the amplifiers 72 and 73 are also interconnected by means of a resistor 76. The output of the amplifier 73 is connected through a resistor 77 to one input of an operational amplifier 78 and the output of the amplifier 72 is connected through a voltage divider including a resistor 79 and a potentiometer 80 to a second input of the amplifier 78. The potentiometer 80 is used to balance the two inputs to the amplifier 78 such that the output of the amplifier 78 is a function of the difference between the outputs of the two amplifiers 72 and 73. A feedback resistor 81 is placed between the output and one input of the amplifier 78 for controlling the gain of the amplifier 78. The amplifiers 72, 73 and 78 function together as the preamplifier 19 for the low level output signal from the load cell 17. the preamplifier 19 may have a total gain on the order of 300 or more.

The output of the amplifier 78 is connected sequentially through a resistor 82, an operational amplifier 83, a resistor 84, a normally closed switch 85 and an amplifier 86 to a terminal 87. The amplifier 83 establishes the span or range of the analog signal which is proportional to the weight of material on the load cell 17. A potentiometer 88 is connected across a low voltage source for applying a controlled voltage through a resistor 89 and the switch 85 to the input of the amplifier 86. The potentiometer 88 provides an adjustment for initially setting the analog output at the terminal 87 to zero when no load is applied to the load cell 17. The negative output of the gated power supply 18 is connected through a variable resistor 90 to an input of the amplifier 83. The variable resistor 90 forms an initial or course adjustment for the span of the analog weight signal applied to the terminal 87. A variable feedback resistor 91 is connected between the output and one input of the amplifier 83 for controlling the gain of the amplifier 83, thus functioning as a fine span adjustment. After the analog signal on the terminal 87 is initially set to zero with no material on the belt conveyor, a known weight near the maximum capacity of the belt conveyor is placed on the load cell 17 and the variable resistors 90 and 91 are used to calibrate the analog signal on the terminal 87 to a predetermined level for the known weight on the load cell 17.

The effects of transient conditions such as heat, voltage variations and the ageing of circuit components in the amplifiers 72, 73, 78 and 83 may cause the analog weight signal applied to the terminal 87 to drift from its initial zero setting. An automatic zeroing circuit is therefore provided to compensate for these transient conditions. The output of the amplifier 83 is connected through an normally open switch 92 and a resistor 93 to the input of an operational amplifier 94. A capacitor 95 is placed between the input and the output of the amplifier 94 to cause the amplifier 94 to store the signal applied to its input. The output of the amplifier 94 is connected through a resistor 96, an inverting amplifier 97 and a resistor 98 back to the input of the amplifier 83. A feedback resistor 99 is placed in parallel with the amplifier 97 for controlling the gain of the amplifier 97. When the gated power supply 18 is turned off to remove power from the load cell 17 and the amplifier 83 and subsequently the switch 92 is closed, the amplifier 94 stores the unwanted output of the amplifier 83 until the capacitor 95 is charged to a steady state level determined by the unwanted output of the amplifier 83. If the switch 92 is then opened, the amplifier 94 will have a substantially constant output determined by the charge on the capacitor 95. The discharge rate of the capacitor 95 is quite slow due to the very high input impedance of the operational amplifier 94. The output of the amplifier 94 is inverted by an amplifier 97 and applied to the input of the amplifier 83 to bring the output of the amplifier 83 to a predetermined constant level. when the gated power supply 18 is again turned on, the amplifier 83 will have an input comprising the sum of the ananlog load cell voltage applied through the resistor 82, the span control voltages from the variable resistors 90 and 91 and the automatic zero voltage applied from the amplifier 97 through the resistor 98.

The switches 85 and 92 are preferably electronic switches of conventional design, such as field effect transistors. The switches 85 and 92 and the gated power supply 18 are controlled by a timing circuit 100 as shown in FIG. 6. The timing circuit 100 controls cycling of the automatic zero circuit at a convenient rate, for example 120 times per second. A 60 Hz. commercial power source 101 may, for example, be connected through a one-shot multivibrator 102 for generating 120 pulses per second to periodically trigger the timing circuit 100. The timing pulses generated by the one-shot multivibrator 102 are shown at A on the graph in FIG. 6. Upon the occurrence of a timing pulse from the multivibrator 102, the timing circuit 100 opens the switch 85 to disconnect the amplified analog load cell signal from the amplifier 86. The timing of the operation of the switch 85 is shown at B in FIG. 6. Subsequent to the opening of the switch 85, the power supply 18 is gated off, as shown at C in FIG. 6, by the timing circuit 100 to remove power from the load cell 17 and from the course span control resistor 90. When the power supply 18 is gated off, the amplifier 83 may have an undesirable output because of voltage transients, temperature drift or component ageing. At this time, the timing circuit 100 closes the switch 92 to connect the automatic zeroing circuit to the output of the amplifier 83. Timing of the operation of the switch 92 with respect to the power supply 18 and the switch 85, is shown at D in FIG. 6. When the switch 92 is closed, the amplifier 94 will rapidly store the output of the amplifier 83 until the charge on the capacitor 95 reaches a steady state condition, at which time the amplifier 94 will have a steady output. This output is inverted by the amplifier 97 and applied through the resistor 98 to the input of the amplifier 83 to cancel or zero the unwanted component of the output of the amplifier 83. The switch 92 is then opened by the timing circuit 100. Immediately after the switch 92 is opened, the power supply 18 is gated on and, subsequently, the switch 85 is closed to again apply an analog output signal from the amplifier 83 to the input of the amplifier 86.

While the output from the amplifiers 72, 73, 78 and 83 is being automatically zeroed, it is apparent that the signal applied to the terminal 87 will be at zero due to the opening of the switch 85. Thus, the signal applied to the terminal 87 would be expected to have gaps, as shown in B of FIG. 6, resulting from operation of the switch 85. However, the amplifier 86 is provided with a capacitor 103 and a resistor 104 to fill the gaps caused by the opening the switch 85. The resistor 104 is connected from the output of the amplifier 86 through the switch 85 to the input of the amplifier 86 to control the gain of the amplifier 86 when the switch 85 is closed. The capacitor 103 is connected directly between the input and the output of the amplifier 86. During the time that the switch 85 is closed, the capacitor 103 will be charged to a substantially steady state condition determined by the input and output of the amplifier 86. When the switch 85 is opened by the timing circuit 100, the steady state charge on the capacitor 103 will cause the amplifier 86 to maintain or hold its output, thereby filling gaps which would otherwise occur in the analog weight signal on the terminal 87. During this time, the charge on the capacitor 103 will be maintained substantially constant due to the extremely high input impedance of the operational amplifier 86. Thus, the terminal 87 will see a substantially continuous analog signal which will vary as the load on the load cell 17 varies.

As stated above under the description of the block diagram of FIG. 1, the analog weight signal is used to modulate the constant width, frequency modulated pulse train. It will be appreciated that the timing circuit 100 may be triggered directly by the pulse train from the terminal 54. If the automatic zero circuit is triggered immediately after each pulse on the terminal 54 and the automatic zero cycle is completed in a time interval shorter than the shortest interval between the pulses, the switch 85 and the gap fill circuit may be eliminated. The elimination of the switch 85 and the gap fill circuitry will cause the analog output on the terminal 87 to be interrupted each time the analog weight signal is automatically zeroed. However, the interruptions will occur only while there is no output pulse on the terminal 54. Since the analog signal on the terminal 87 is used to modulate the amplitude of the constant width pulses, it is apparent that the interruptions of the analog weight signal on the terminal 87 will not affect operation of the integrating scale 10.

Turning to the circuit of FIG. 4 and the related graph of FIG. 4a, the analog weight signal on the terminal 87 is applied through a resistor 110 to the source electrode of a field effect transistor 111. The output appearing at the drain electrode of the field effect transistor 111 will depend upon the voltage applied to the gate electrode. The edge electrode is normally connected through a resistor 112 to a −15 volt power supply so that the transistor 111 is normally biased into a nonconducting state. However, the gate electrode is also connected through a transistor 113 to ground. The base of the transistor 113 is connected through a bias resistor 114 to the −15 volt power source and through a resistor 115 to the terminal 54 connected to the Q output of the flip-flop 53 in FIG. 2. A typical speed pulse train appearing on the terminal 54 is shown at A in FIG. 4a. This pulse train occurs when material is transferred at a predetermined fast speed prior to the time $t_2$ and at half that rate after the time $t_2$. During the constant width pulses generated by the flip-flop 53, the base of the transistor 113 is grounded through the resistor 115, biasing the transistor 113 into a conducting state. When the transistor 113 conducts to connect the gate of the field effect transistor 111 to ground, a voltage will appear on the drain electrode of the transistor 111 which is proportional to the analog weight signal on the terminal 87. A typical analog weight signal on the terminal 87 is shown at B in FIG. 4a. This signal is shown as being constant prior to the time $t_1$ to indicate a constant weight and as gradually increasing after the time $t_1$ to indicate that the weight is increasing. The output or drain electrode of the transistor 111 is connected to an input of an operational amplifier 116. The signal applied to the amplifier 116 is shown at C in FIG. 4a. It will be noted that the pulse spacing in C increases with a decrease in the material transfer speed and that the pulse magnitude increases with an increase in weight.

From the above description, it is apparent that the input to the amplifier 116 is, in effect, the constant width pulse train on the terminal 54 modulated or multiplied by the analog weight signal on the terminal 87. However, the field effect transistor 111 does not have infinite resistance when biased into a nonconducting state. A portion of the analog weight signal on the terminal 87 would tend to pass through the transistor 111 even though it is in its nonconducting condition. Therefore, a transistor 117 is provided to ground the source electrode of the transistor 111 during the time interval between the constant width pulses on the terminal 54. The terminal 54 is connected through a diode 118 and a resistor 119 to the base of the transistor 117. A bias resistor 120 is also provided to connect the base of the transistor 117 to ground. During the variable time intervals between the constant width pulses on the terminal 54, the transistor 117 conducts to ground the source electrode of the field effect transistor 111. While the transistor 117 is conducting, the analog weight voltage on the terminal 87 will appear across the resistor 110 and no signal will pass through the transistor 111 to the input of the amplifier 116.

The gain of the amplifier 116 is determined by the feedback resistance between the output and the input of the amplifier 116 and the resistance in the input circuit of the amplifier 116. The input resistance of the amplifier 116 consists of the sum of the resistor 110 and the resistance between the source and drain electrodes of the field effect transistor 111 when the gate electrode is grounded through the transistor 113. Unfortunately, the resistance of the field effect transistor 111 is affected by temperature. Therefore, a resistor 121 and a similar field effect transistor 122 are connected in series between the output and the input of the amplifier 116. The gate electrode of the field effect transistor 122 is grounded so that the two field effect transistors 111 and 122 will have a similar change in forward resistance when heated through the same temperature change. Through the use of the field effect transistor 122 in the feedback circuit for the amplifier 116, the amplifier 116 will have a temperature compensated output equal to the product of the constant width pulse train which has a frequency or repetition rate proportional to the speed of the belt conveyor and the analog signal which has a voltage proportional to the weight of material on a segment of the belt conveyor.

The average value of the modulated pulse train appearing at the output of the amplifier 116 is proportional to the rate at which material is transferred on the belt conveyor. The modulated pulse train at the output of the amplifier 116 is averaged or filtered by means of a highly dampened amplifier 123. The output of the amplifier 116 is connected through a pair of series connected resistors 124 and 125 to one input of the amplifier 123. The second input of the amplifier 123 is connected through a resistor 126 to ground. A capacitor 127 is connected from between the two series resistors 124 and 125 to ground. A portion of the output of the amplifier 123, as determined by a voltage divider consisting of a variable resistor 128 and a fixed resistor 129 connected in series between the output of the amplifier 123 and ground, is fed back to the input of the amplifier 123. The junction between the variable resistor 128 and the fixed resistor 129 is connected through a capacitor 130 to the input of the amplifier 123 and is also connected through a resistor 131 to the junction between the series resistors 124 and 125. When a high input signal is applied to the amplifier 123, the capacitor 130 is charged at a rate determined by the time constant of the capacitor 130 and the variable resistor 128. Between pulses at the output of the amplifier 116, the capacitor 130 is slowly discharged through the series resistors 131 and 125. The capacitor 127 also dampens changes in the input to the amplifier 123. In view of the dampening effect of the capacitor 130 and the capacitor 127, the amplifier 123 will apply to a terminal 132 a continuous analog signal which is proportional to the rate at which material is transferred on the belt conveyor.

The analog rate signal on the terminal 132 may be integrated over a period of time for measuring the total weight of material transferred over such period of time, or the rate signal may be amplified and displayed on a rate meter. The rate signal on the terminal 132, of course, may also be used as a control signal for apparatus external to the scale 10, namely, for controlling the speed of the belt conveyor, for operating a recorder or for any other necessary control function. The span of the rate signal on the terminal 132 is adjusted by means of the variable resistor 128. The resistor 128 may, for example, be set such that ten volts will appear on the terminal 132 when the belt conveyor is operating at its maximum capacity.

As stated above, one use of the rate signal on the terminal 132 is to operate a new meter. The terminal 132 may be connected through a resistor 133 to one input of an amplifier 134. A feedback resistor 135 is connected between the output of the amplifier 134 and a second input to the amplifier 134. The second input is also connected through a resistor 136 to ground. The output of the amplifier 134 is connected through a resistor 137 to the input of an amplifier 138. A capacitor 139 is connected between the output and the input of the amplifier 138. A variable resistor 140 is connected between the output of the amplifier 138 and the input of the amplifier 134 which is connected to the resistor 133. The variable resistor 140 controls the total gain of the two amplifiers 134 and 138 for providing a fine control over the span of the rate displayed on the rate meter 24. The output of the amplifier 138, which is an analog rate signal, is applied through a variable resistor 141 to the meter 24. The variable resistor 141 is provided to control the span of the meter 24. The output of the amplifier 138 is also connected to a terminal 142 which will be discussed further below under the discussion of FIG. 5. The various controls and calibration adjustments in the scale 10 permit calibrating the meter 24 to read in any desired units, such as pounds per second, pounds per minute, tons per minute, tons per hour, etc. The scale 10 may also be easily calibrated so that the full scale reading of the meter 24 corresponds to the maximum transfer rate for any conveyor to which the scale 10 is attached.

Referring now to FIG. 5, the analog rate signal on the terminal 132 (from FIG. 4), is applied through a resistor 148 to a summing junction 149. The summing junction 149 is also connected through a resistor 150 to the tap or variable terminal 151 on a potentiometer 152. The ends of the potentiometer 152 are connected to the plus and minus terminals of a 15 volt regulated voltage source (not shown). The tap terminal 151 is set to the center of the potentiometer 152.

The voltage appearing on the summing junction 149 is integrated by means of an amplifier 153 and a parallel feedback capacitor 154. The output of the integrator 153 is connected through a resistor 155 and an operational amplifier 156 to a junction 157. A feedback resistor 158 is connected between the output and the input of the amplifier 156 to control the gain of the amplifier 156. The junction 157 at the output of the amplifier 156 is connected through a resistor 159 to the negative input of an operational amplifier 160 and from the input of such amplifier 160 through a resistor 161 to the positive terminal of the 15 volt reference source. Similarly, the junction 157 is connected through a resistor 162 to the positive input of an operational amplifier 163 and from the input of such amplifier 163 through a resistor 164 to the negative terminal of the 15 volt reference source. It is apparent that the four series resistors 161, 159, 162 and 164 extending between the positive and negative terminals of the 15 volt reference source form a voltage divider. The resistor 161 and 164 are of the same value and the resistors 159 and 162 are of the same value. As a consequence of this, the negative input of the amplifier 160 will normally be at a positive voltage with respect to the junction 157 and the positive input of the amplifier 163 will normally be at a similar, but negative voltage with respect to the junction 157. Both of the amplifiers 160 and 163 will, therefore, normally be switched off. Feedback for the amplifier 160 is provided through a Zener diode 165 connected between the output of the amplifier 160 and the negative input of the amplifier 160. The positive input of the amplifier 160 is grounded through a resistor 167. The input of the amplifier 160 is clamped by diodes 166 and 170 to a specified voltage level. Feedback for the amplifier 163 is provided through a Zener diode 168 connected between the output and the negative input of the amplifier 163. The negative input of the amplifier 163 is also connected through a resistor 169 to ground.

As previously stated, the negative input of the amplifier 160 is normally maintained positive by the 15 volt reference source, and is clamped to a specified voltage level by the diodes 166 and 170. The positive input of the amplifier 163, which is normally maintained negative by the 15 volt reference source, is clamped to a specified voltage level by two diodes 171 and 172. When the integrating amplifier 153 integrated a positive voltage on the summing junction 149, an increasingly positive voltage is applied to the junction 157. This voltage will cause current to initially flow through the resistor 162 and subsequently through the resistor 162 and the diode 172 when the current through the resistor 162 is greater than the current through the resistor 164, with the voltage on the positive terminal of the amplifier 163 going from negative towards positive. Current will also flow through the resistor 159 and the diode 166. As the positive input of the amplifier 163 is driven positive, the output of the amplifier 163 will be driven positive. The amplifier 163 will initially have an extremely high gain due to the fact that Zener diode 168 is not conducting. The output of the amplifier 163 will rapidly increase until the breakdown voltage of the Zener diode 168 is reached. As soon as this condition is reached, the output of the amplifier 163 will be stabilized because of the voltage regulating properties of Zener diodes. The output of the amplifier 163 is connected through a resistor 173 to the J input of a flip-flop 174. A high input will be maintained on the flip-flop 174 as long as the positive input of the amplifier 163 is maintained at a positive voltage.

If, on the other hand, a negative signal is applied from the terminal 132 to the summing junction 149, the integrating amplifier 153 and the amplifier 156 will apply a negative signal on the junction 157. The negative signal on the junction 157 will cause current to initially flow through the resistor 159 and subsequently through the resistor 159 and the diode 170 when the current through the resistor 159 is greater than the current through the resistor 161 and also through the resistor 162 and the diode 171. When the signal on the junction 157 becomes sufficiently high, the negative input of the amplifier 160 will be driven negative. The amplifier 160 will have an extremely high gain until its output reaches the breakdown voltage of the Zener diode 165. At this point, feedback current will flow through the Zener diode 165 to stabilize the output of the amplifier 160. The output of the amplifier 160 is connected through a resistor 175 to the J input of a flip-flop 176. The signal will be maintained on the input of the flip-flop 176 only as long as the negative input of the amplifier 160 is maintained at a negative voltage. It is readily apparent that, at most, only one of the flip-flops 174 and 176 may have a signal on its J input. The K input of each of the flip-flops 174 and 176 are connected together to a positive voltage source such that these flip-flops are normally cleared when a signal is not applied to the J input.

The Q output of the flip-flop 174 controls a switch 177 to connect the −15 volt terminal of the reference source through a resistor 178 to the summing jucntion 149. Similarly, the Q terminal of the flip-flop 176 controls a switch 179 to connect the positive terminal of the 15 volt reference source through a resistor 180 to the summing junction 149. The switches 177 and 179 may be of any conentional design and may, for example, each consist of a field effect transistor. After the amplifier 153 integrates a positive signal on the junction 149 until the amplifier 163 is turned on and the flip-flop 174 is set, the switch 177 is closed to connect the negative terminal of the 15 volt reference to the summing junction 149. At this instance, the polarity of the voltage on the junction 149 changes, causing a reversal in the slope of the changing output of the intergrating amplifier 153. If, on the other hand, the integrator 153 integrates a negative signal on the junction 149 until the amplifier 160 turns on and the flip-flop 176 is set, the switch 179 connects the positive terminal of the 15 volt reference source to the summing junction 149 and, again, the slope of the changing output of the integrator 153 reverses.

The flip-flops 174 and 176 are triggered by means of a square wave clock pulse signal on the clock line 61 (from FIG. 2). A portion of the square wave clock signal on the line 61 is shown graphically at A in FIG. 7. In the following discussion, we will assume that the analog rate signal applied on the terminal 132 is positive and of a relatively low voltage indicating a relatively low forward transfer rate. The integrator 153 will integrate this signal over a period of time to cause the amplifier 156 to apply an increasingly positive voltage on the junction 157. Such an increasing voltage is shown in the segment 184 in the graph B on FIG. 7. Integration will continue in this direction for the time interval $t_1$. The interval $t_1$ ends when the voltage shown by the dahsed line 185 exceeded, causing the amplifier 163 to suddenly turn on and apply a signal to the J input of the flip-flop 174 and a trigger pulse is applied on the clock line 61 to the flip-flop 174. when these two conditions occur, the flip-flop 174 is set, closing the switch 177. Closure of the switch 177 connects the negative terminal of the reference source to the summing junction 149, causing the integrator 153 to integrate the difference between the −15 volt reference and the low voltage positive analog rate signal on the line 132. As shown in the graph B in FIG. 7, the slope of the changing voltage on the junction 157 is reversed. This voltage is shown in the segment 186.

After the switch 177 is closed and the direction of the integration reverses, the voltage on the junction 157 rapidly drops below the voltage 185 required to maintain the amplifier 163 in an on state. As a consequence of the amplifier 163 turning off, the next clock pulse on the line 61 resets or clears the flip-flop 174, opening the switch 177. Thus the flip-flop 174, or the flip-flop 176, will be set, at most, for the time required for one clock pulse on the line 61. The flip-flop 174 will remain in a cleared state for a time interval proportional to the analog rate signal on the terminal 132. This is shown in graph B in FIG. 7 where the flip-flop 174 is maintained off for the indefinite time interval $t_1$ and is on for the fixed time interval $t_2$ which is equal to the time of one clock pulse.

If the analog rate signal applied on the terminal 132 increases in value towards its maximum voltage, the voltage applied to the junction 157 at the output of the amplifier 156 appears as is shown by the segment 187 in graph C of FIG. 7. Here the slope of the integration of the unknown 187 has rapidly increased, greatly shortening the time interval $t_1$ during which the unknown is integrated. In addition, the slope of integration of the difference between the reference and the unknown has decreased as shown by the segment 188. The decrease in the slope of segment 188 results in a much smaller voltage change in the output of the integrating amplifier 153 during the fixed time interval $t_2$. This decrease in voltage change further decreases the time interval $t_1$. Thus the total time interval for one cycle in graph C, or the sum of the two time intervals $t_1$ and $t_2$, is much shorter than the time interval in graph B.

It will be apparent that the frequency at which the flip-flop 174, or the flip-flop 176, is turned on and off is proportional to the voltage of the analog rate signal on the terminal 132. If the voltage on the terminal 132 is positive because the material is on the conveyor belt, only the flip-flop 174 will be periodically set and cleared. If, on the other hand, the voltage on the terminal 132 is negative as a consequence of no material on the conveyor belt and tension on the load cell 17, the flip-flop 176 will be periodically set and cleared. Thus the two flip-flops 174 and 176 in combination with the integrator 153 detect when the load cells 17 are in compression or tension.

The Q output of the flip-flop 174 is connected to the J input of a flip-flop 191 and the Q output of the flip-flop 176 is connected to the K input of the flip-flop 191. The clock pulse line 63 is connected to the trigger input of the flip-flop 191. On the next clock pulse after the flip-flop 174 is set, the flip-flop 191 will be set and will remain set until the occurrence of a clock pulse while the flip-flop 176 is set. The state in which the flip-flop 191 is set determines the direction in which the counter 28 is counted.

The counter 28 is driven by the motor 27, which is a four-phase stepping motor. The motor 27 has four windings 192-195, two of which are always energized. Stepping of the motor 27 is accomplished by de-energizing one of the coils and energizing another of the coils. Thus, if the coils 192 and 194 are initially energized, the motor 27 is stepped forward by de-energizing the coil 194 and energizing the coil 195 while the coil 192 is maintained in an energized state. Or, the motor 27 may be stepped in a reverse direction by de-energizing the coil 192 and energizing the coil 193, while maintaining the coil 194 energized. One end of each of the coils 192-195 is connected in common to a suitable power source and the other ends of the coils 192-195 are connected through an electronic switch 196-199, respectively, to ground. The switches 196-199 may, for example, consist of transistors. The switches are energized by the four outputs of two flip-flops 200 and 201. The Q output of the flip-flop 200 controls the switch 197 and the $\overline{Q}$ output of the flip-flop 200 controls the switch 196. Similarly, the Q output of the flip-flop 201 controls the switch 199 and the $\overline{Q}$ output of the flip-flop 201 controls the switch 198. Since one of the outputs of each of the two flip-flops 200 and 201 is always set, one of the switches 196 and 197 will always be energized by the flip-flop 200 and one of the switches 198 and 199 will always be energized by the flip-flop 201. Thus, one of the motor windings 192 and 193 is always energized and one of the motor windings 194 and 195 is always energized.

The states of the flip-flops 200 and 201 are controlled by a logic network including four AND gates 202-205. The outputs of the AND gates 202 and 203 are connected through a NOR gate 206 to the K input of the flip-flop 200 and also through the NOR gate 206 and through an inverter 207 to the J input of the flip-flop 200. Similarly, the outputs of the AND gates 204 and 205 are connected through a NOR gate 208 to the K input of the flip-flop 201 and the output of the NOR gate 208 is also connected through an inverter 209 to the J input of the flip-flop 201. The AND gate 202 has two inputs, one connected to the Q output of the direction control flip-flop 191 and one connected to the Q output of the flip-flop 201. The two inputs of the AND gate 203 are connected to the $\overline{Q}$ output of the direction control flip-flop 191 and the $\overline{Q}$ output of the flip-flop 201. The two inputs of the AND gate 204 are connected to the $\overline{Q}$ output of the direction control flip-flop 191 and to the Q output of the flip-flop 200. Finally, the two inputs of the AND gate 205 are connected to the Q output of the direction control flip-flop 191 and to the $\overline{Q}$ output of the flip-flop 200. The flip-flops 200 and 201 are triggered by pulses on a trigger line 210.

In operation of this logic network, assume that the counter is to operate in a forward direction and, therefore, that the direction control flip-flop 191 is set to a high Q output. The Q output of the direction control flip-flop 191 enables the AND gates 202 and 205. If we initially assume that both of the flip-flops 200 and 201 are cleared, then the AND gate 205 will have two high inputs and a high output. The high output of the AND gate 205 will cause the NOR gate 208 to have a low output and thus the inverter 209 will apply a signal to the J input of the flip-flop 201. Both of the AND gates 202 and 203 will have low outputs, causing the NOR gate 206 to apply a high signal to the K input of the flip-flop 200. On the occurrence of the next pulse on the trigger line 210, the flip-flop 201 will be set, causing the switch 198 to open and the switch 199 to close. The switch 196 remains closed since the flip-flop 200 remains cleared. Setting of the flip-flop 201 applies a high signal to the second input of the gate 202, causing the NOR gate 206 to have a low output and the inverter 207 to apply a signal to the J input of the flip-flop 200. There has been no change in the signal on the inputs on the gate 205, so the inverter 209 maintains the signal on the J input of the flip-flop 201. Therefore, the next pulse on the trigger line 210 sets the flip-flop 200, thereby closing the switch 197 and opening the switch 196. Setting the flip-flop 200 also removes one input from the AND gate 205, causing the next trigger pulse on the line 210 to clear the flip-flop 201. Thus, it will be apparent that the trigger pulses alternately set and clear the two flip-flops 200 and 201. If the direction control flip-flop 191 had been cleared to a high $\overline{Q}$ state due to the detection of a negative load, the AND gates 202 and 205 would be inhibited and the AND gates 203 and 204 would each have a high input. This would cause the flip-flops 200 and 201 to still be alternately set and cleared, but in a reverse direction to reverse the direction in which the motor 27 operates the counter 28.

As previously stated, one of the flip-flops 174 and 176 is alternately set and cleared at a frequency proportional to the rate at which material is conveyed. The flip-flops 174 and 176 are used as a signal source to control pulses on the trigger line 210 for the flip-flops 200 and 201 and, thus, to control the rate at which the motor 27 steps the counter 28. Since one of the flip-flops 174 and 176 is always cleared while the other of the flip-flops 174 and 176 is alternately cleared and set, the $\overline{Q}$ outputs of each of the flip-flops 174 and 176 are connected to a NAND gate 211. The NAND gate 211 will have a low output when both of the flip-flops 174 and 176 are cleared during integration of the analog rate signal on the terminal 132. During integration of the reference, one of the flip-flops 174 or 176 will be set and the NAND gate 211 will have a high output. The output of the NAND gate 211 is connected through a NAND gate 212 and a jumper wire 213 through a pair of inverters 214 and 215 to the trigger line 210. The second input of the NAND gate 212 is normally high. Therefore, the NAND gate 212 will have an output which is switched when the output of the NAND gate 211 is switched by the flip-flops 174 and 176. Therefore, a signal is applied on the trigger line 210 which is switched whenever the NAND gate 211 is switched by the flip-flops 174 and 176.

It will be apparent that the range of the counter 28 may be increased by a predetermined factor by dividing the pulses on the line 210 by such a factor. If, for example, the output of the NAND gate 211 is switched twice for each time the signal on the trigger line 210 is switched (the pulse count is divided in half), the range of the counter 28 will be doubled. It has therefore been found desirable to include an integrating factor circuit 216 for dividing the pulse output of the NAND gate 211 by predetermined factors of, for example, one, two, four, eight, 16 and 32 to increase the range of the counter 28 by such factors. The output of the NAND gate 212 is connected to the trigger input of a four-bit binary counter 217. The jumper 213 may be moved to selectively connect one of the four outputs of the counter 217 through the inverters 214 and 215 to the trigger line 210 to selectively divide the output of the gate 212 by factors of two, four, eight and 16. The divide-by-16 output of the counter 217 is also connected to trigger a flip-flop 218 to provide a divide-by-32 factor. If the jumper 213 is moved from the output of the NAND gate 212 to connect the first output of the counter 217 to the inverter 214, the output of the NAND gate 211 must be switched twice for each time the signal on the trigger line 210 is switched.

When the conveyor is empty, or nearly empty, transient conditions may cause the counter 28 to erroneously indicate that a small amount of material has been conveyed. Therefore, circuitry has been provided to block or inhibit operation of the counter 28 when the conveyor is operated below a minimum rate, such as below one or two percent of the maximum transfer rate. The analog rate signal on the terminal 142 (from FIG. 4) is connected through a resistor 219 to the input of an operation amplifier 220. The input of the amplifier 220 is also connected through a pair of reverse biased parallel diodes 221 and 222 to ground to limit the level of the input. Feedback is provided by means of a Zener diode 223. As a consequence, when the amplifier 220 is initially turned on, it will have an extremely high gain until the breakdown voltage of the Zener diode 223 is reached, at which time the output of the amplifier 220 is stabilized. The input of the amplifier 220 is also connected through a resistor 224 to a voltage divider comprising a pair of series resistors 225 and 226. Selection of the values of the resistors 225 and 226 control the voltage required on the terminal 142 to turn the amplifier 220 on. The resistors 225 and 226 are typically selected such that the amplifier 220 will be on as long as the analog rate signal on the terminal 142 exceeds one or two percent of its maximum value. The output of the amplifier 220 is connected to a NOR gate 227. The other input of the NOR gate 227 is connected to ground through a switch 228. The normally low output of the NOR gate 227 is connected through an inverter 229 to the NAND gate 212. Thus, whenever the analog rate signal on the terminal 142 is below a predetermined percentage of its maximum value, a low signal is applied to the second input of the NAND gate 212 to inhibit passage of a pulse signal from the NAND gate 211 to the trigger line 210.

The switch 228 is a test switch provided for disabling the cut-out circuit which includes the amplifier 220 and for disabling the integrating factor circuit 216. When the switch 228 is set to "Test," the counter 28 is allowed to run when less than the minimum allowable percentage of the rated capacity is on the belt conveyor. The switch 228 normally connects one input of the NOR gate 227 to ground to inhibit the amplifier 220 during zeroing of the scale 10. This is necessary due to the fact that belt conveyors inherently have a nonuniform weight over their length. If the scale 10 is not calibrated for a dynamic zero, the counter 28 will include an error factor dependent upon the degree of nonuniformity of the conveyor.

It will be appreciated that various changes and modifications may be made in the scale 10 without departing from the spirit and the scope of the claimed invention. In one embodiment, the scale 10 may, for example, be modified to include only the circuitry required for counting or measuring the total quantity of material delivered over a period of time without indicating the rate at which the material is delivered. Or, in another embodiment, the scale 10 may be modified to include only the circuitry required for indicating the transfer rate with the circuitry for indicating the total quantity of material transferred omitted. It will also be readily apparent that although the scale 10 has been described for use with a belt conveyor, it is suitable for use with other types of material conveyors and for measuring quantities other than transfer rate and the total quantity of material transferred. If, for example, the tachometer 11 is driven from the output shaft of a motor and the load cell 17 senses the torque output of the motor, then the rate meter 24 will indicate the instantaneous power output of the motor. The meter 24 may be calibrated to read in any convenient units, such as horsepower. The counter 28 is then calibrated to indicate the total energy output of the motor over a period of time and may indicate the total foot-pound output of the motor.

It will also be appreciated that measuring apparatus according to the present invention may provide various outputs for controlling accessory equipment. The analog rate signal on the terminal 132 (FIG. 4) may, for example, drive a recorder or supply a control signal for use in controlling the conveyor. Or, the counter 28 may be replaced by a digital counter which, for example, supplies a total weight signal to a batching control computer.

What I claim is:

1. Measuring apparatus for use with a conveyor for moving material through a region comprising, in combination, means for generating a train of constant width pulses which are repeated at a frequency proportional to the speed at which the material is transferred through the region, means for generating an analog signal proportional to the instantaneous weight of material in the region, multiplying means responsive to the analog weight signal and to the pulse train for generating a modulated pulse train corresponding to the product of the analog weight signal and the pulse train, and means for measuring the average value of the modulated pulse train, whereby such average value is proportional to the rate at which material is transferred through the region.

2. Measuring apparatus for use with a conveyor for moving material through a region, as defined in claim 1 wherein said multiplying means includes switch means responsive to the pulse train for selectively passing and blocking the analog weight signal, said switch means passing the analog weight signal during the constant width pulses in the pulse train and blocking the analog weight signal between the constant width pulses.

3. Measuring apparatus, as defined in claim 1, wherein said measuring means includes means for filtering the modulated pulse train to obtain a continuous analog signal proportional to the material transfer rate, and means responsive to the continuous analog signal for indicating such material transfer rate.

4. Measuring apparatus for use with a conveyor for moving material through a region, as defined in claim 3, further including voltage-to-frequency converter means responsive to said continuous analog signal for generating a frequency modulated pulse train having a frequency proportional to said transfer rate.

5. Measuring apparatus for use with a conveyor for moving material through a region, as defined in claim 4, further including stepping motor means responsive to said frequency modulated pulse train and counting means driven by said stepping motor means for indicating the total weight of material conveyed by the conveyor over a period of time.

6. Measuring apparatus, as defined in claim 3, and including means for changing the pulse rate of the train of constant width pulses by a predetermined factor whereby the average value of the continuous analog signal is changed by such predetermined factor, and means for changing the predetermined factor.

7. Measuring apparatus, as defined in claim 1, wherein said measuring means includes means for filtering the modulated pulse train to obtain a continuous analog signal proportional to the material transfer rate, means for integrating the continuous analog signal, and means for measuring the total quantity of material conveyed through the region over a period of time by measuring the integral of the continuous analog signal over such period of time.

8. Measuring apparatus, as defined in claim 7, and including means for changing the pulse rate of the train of constant width pulses by a predetermined factor whereby the measure of the total quantity of material conveyed is changed by such predetermined factor, and means for changing the predetermined factor.

9. Measuring apparatus, as defined in claim 7, wherein said integrating means includes converter means for generating a pulse signal having a pulse rate proportional to the continuous analog signal, and wherein said means for measuring the total weight of conveyed material includes means for counting pulses in the pulse signal whereby the pulse count is proportional to the total weight of conveyed material.

10. Measuring apparatus, as defined in claim 9, and including means for changing the number of pulses in the pulse signal by a predetermined factor whereby the weight range covered by said counting means is changed.

11. Measuring apparatus, as defined in claim 9, and including means for inhibiting the operation of said counter means when said conveyor is moving material at less than a predetermined minimum rate.

12. Measuring apparatus, as defined in claim 7, and including means for inhibiting the operation of said means for measuring the total weight of conveyed material when the material is conveyed at less than a predetermined minimum rate.

13. Measuring apparatus, as defined in claim 1, and including a power source, means for operating said analog signal generating means for said power source, means for periodically interrupting power from said power source to said analog signal generating means, and means operable while power to said analog signal generating means is interrupted for setting the output of said analog signal generating means to zero.

14. Measuring apparatus, as defined in claim 13, wherein said power interrupting means interrupts power to said generating means only between the constant width pulses in the pulse train.

15. Measuring apparatus, as defined in claim 13, and including means operable while power to said analog signal generating means is interrupted for maintaining said modulated pulse train at its amplitude prior to the power interruption.

16. A method for measuring the quantity of material transferred through a region, comprising the steps of:
   a. generating a train of constant width pulses having a frequency proportional to the speed at which material is transferred through the region;
   b. modulating the amplitude of the pulse train in proportion to the instantaneous weight of material in the transfer region: and
   c. filtering the modulated pulse train to produce a continuous signal proportional to the product of the weight of material in the region times the transfer speed, whereby the magnitude of the filtered signal is a measure of the instantaneous rate at which material is transferred through the region.

17. A method for measuring the quantity of material transferred through a region, as set forth in claim 16, and further including the steps of:
   d. converting the filtered signal into a second pulse train having a pulse rate proportional to the magnitude of the filtered signal; and
   e. totalizing the pulses in such second pulse train as a measure of the total quantity of material transferred.

* * * * *

UNITED STATES PATENT OFFICE
CERTIFICATE OF CORRECTION

Patent No. 3,754, 126      Dated  August 21, 1973

Inventor(s)  Roger B. Williams, Jr.

It is certified that error appears in the above-identified patent and that said Letters Patent are hereby corrected as shown below:

Column 20, line 14, "for" should read -- from --.

Signed and sealed this 1st day of January 1974.

(SEAL)
Attest:

EDWARD M. FLETCHER, JR.
Attesting Officer

RENE D. TEGTMEYER
Acting Commissioner of Patents